C. A. Todd.
Paddle Wheel.
No. 56,834. Patented Jul. 31, 1866.
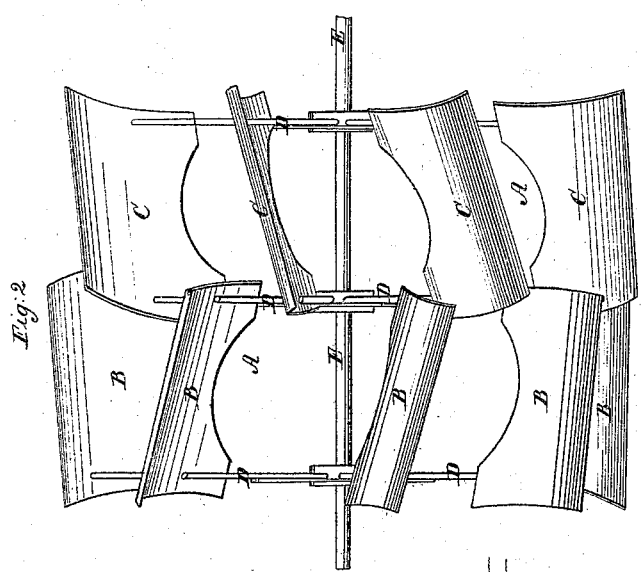
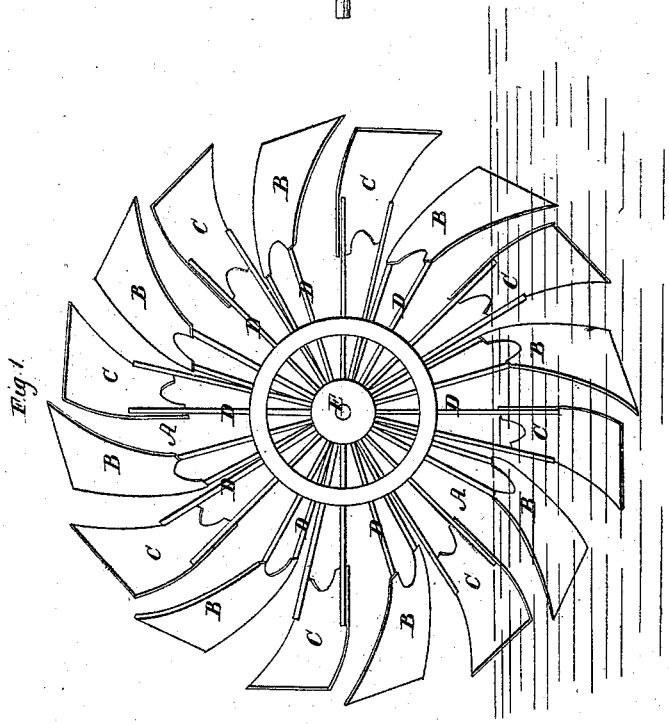
Witnesses:
Inventor:
C. A. Todd

UNITED STATES PATENT OFFICE.

C. A. TODD, OF NEW YORK, N. Y.

IMPROVED PADDLE-WHEEL.

Specification forming part of Letters Patent No. 56,834, dated July 31, 1866.

*To all whom it may concern:*

Be it known that I, CHARLES A. TODD, of the city, county, and State of New York, have invented a new and useful Improvement in Paddle-Wheels; and I do hereby declare that the following is a full, clear, and exact description thereof, which will enable others skilled in the art to make and use the same, reference being had to the accompanying drawings, forming part of this specification.

The present invention relates to certain new and useful improvements in the form of the floats or paddle-boards of paddle-wheels and in the manner of arranging them upon the radial arms of the wheels, the object being to obviate the lifting of the water by the paddles or floats as they emerge from it, and thus relieve them of a great amount of the back-pressure to which they are subjected from the present and now prevalent mode of arranging them at right angles to the width of the wheel.

In accompanying plate of drawings my improvements in paddle-wheels are illustrated, Figure 1 being a side view of a paddle-wheel with its floats arranged according thereto; Fig. 2, an edge view of the same.

Similar letters of reference indicate like parts.

A in the drawings represents a paddle-wheel made according to my improvements, having a double row of paddles or floats, B B and C C, these floats being secured to radial arms D D of the center-shaft E of the wheel in any of the ordinary modes now practiced, but in lieu of being arranged at right angles to the width of the wheel, as heretofore, are so placed that the faces of the float which strike the water as the wheels revolve will be at an acute angle thereto, so that as each float in turn emerges from the water the water, in lieu of being lifted by it, as is now the case, will be guided or thrown off to the outer or inner face of the wheel, as the case may be, the inner ends of the floats being the first to emerge and their outer ends the last, the floats thus leaving the water at a vertical inclination or angle thereto, consequently causing the water which would otherwise be lifted by them to immediately flow or run off the paddles, as is obvious without further explanation.

The paddle-floats, in lieu of being perfectly flat and straight, as heretofore, are slightly bent or curved, as plainly shown in the drawings, so as to more fully secure the object desired to be attained by the present invention.

The series of floats upon the outer half of the width of the paddle-wheel are arranged in the present instance so as to discharge toward the outer end of the wheel, and the series upon the other half so as to discharge to the inner end, the inner ends of the floats upon each section, in lieu of meeting, being at equal distances from each other entirely round the periphery of the wheel.

In lieu of a double series of floats, as hereinabove described, only one may be used, and the floats also may be arranged so as to discharge toward either the inner or outer ends of the paddle-wheel; but I deem the latter way the most advantageous.

What I claim as new, and desire to secure by Letters Patent, is—

The arrangement of the curved floats B C, in combination with the radial arms D, constructed and operating substantially in the manner and for the purpose specified.

The above specification of my invention signed by me this 13th day of November, 1865.

C. A. TODD.

Witnesses:
ALBERT W. BROWN,
M. M. LIVINGSTON.